US011553570B1

United States Patent
Imanaka et al.

(10) Patent No.: US 11,553,570 B1
(45) Date of Patent: Jan. 10, 2023

(54) INTERFACE EXPANDER CIRCUIT FOR LIGHT EMITTING DIODE (LED) DRIVER CIRCUITS

(71) Applicant: Infineon Technologies AG, Neubiberg (DE)

(72) Inventors: Yoshinori Imanaka, Yokohama (JP); Fabio Fragiacomo, Padua (IT); Davide Ghedin, Fiesso d'artico (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/514,468

(22) Filed: Oct. 29, 2021

(51) Int. Cl.
| | |
|---|---|
| *H05B 45/325* | (2020.01) |
| *H05B 45/395* | (2020.01) |
| *B60Q 1/04* | (2006.01) |
| *H05B 45/3725* | (2020.01) |
| *H05B 47/18* | (2020.01) |
| *H05B 45/14* | (2020.01) |

(52) U.S. Cl.
CPC ............ *H05B 45/325* (2020.01); *B60Q 1/04* (2013.01); *H05B 45/14* (2020.01); *H05B 45/3725* (2020.01); *H05B 45/395* (2020.01); *H05B 47/18* (2020.01)

(58) Field of Classification Search
CPC .... H05B 45/325; H05B 45/395; H05B 45/14; H05B 45/3725; H05B 457/18; B60Q 1/04
See application file for complete search history.

(56) References Cited

U.S. PATENT DOCUMENTS

| | | | |
|---|---|---|---|
| 7,126,291 B2 | 10/2006 | Kruse et al. | |
| 2003/0067220 A1 | 4/2003 | Cros et al. | |
| 2005/0289428 A1 | 12/2005 | Ong | |
| 2007/0109807 A1 | 5/2007 | Lynam et al. | |
| 2009/0026958 A1 | 1/2009 | Kitagawa et al. | |
| 2010/0308655 A1* | 12/2010 | Wachi | H02M 3/1588 307/31 |
| 2011/0121744 A1 | 5/2011 | Salvestrini et al. | |
| 2012/0153866 A1* | 6/2012 | Liu | H02M 3/33561 363/21.18 |
| 2014/0086590 A1 | 3/2014 | Ganick et al. | |
| 2015/0130359 A1 | 5/2015 | Bosua et al. | |
| 2015/0319816 A1* | 11/2015 | Chen | H05B 45/20 315/210 |

(Continued)

FOREIGN PATENT DOCUMENTS

WO   WO-2021127537 A1 *  6/2021

OTHER PUBLICATIONS

Infineon Technologies, "ASCLIN_UART_1," AURIX TC2xx Microcontroller Training, V1.0.0, Edition Oct. 17, 2019, 12 pp.

(Continued)

*Primary Examiner* — Abdullah A Riyami
*Assistant Examiner* — Syed M Kaiser
(74) *Attorney, Agent, or Firm* — Shumaker & Sieffert, P.A.

(57) ABSTRACT

An expander circuit may be configured to control a plurality of driver circuits for driving light emitting diodes (LEDs). The expander circuit may comprise a bus interface circuit configured to receive control signals from a processor over a communication bus, and a plurality of modulation signal generators configured to generate modulation signals based on the control signals. The expander circuit may be configured to provide the modulation signals to the plurality of driver circuits for driving the LEDs.

20 Claims, 5 Drawing Sheets

(56) References Cited

U.S. PATENT DOCUMENTS

| | | |
|---|---|---|
| 2016/0101725 A1 | 4/2016 | Oh |
| 2016/0157314 A1* | 6/2016 | Scott .................. H05B 45/46 |
| | | 315/186 |
| 2016/0226388 A1* | 8/2016 | Ren .................. H02M 3/33507 |
| 2016/0316535 A1 | 10/2016 | Reh et al. |
| 2016/0374168 A1 | 12/2016 | Ackmann |
| 2018/0027631 A1 | 1/2018 | Turvy, Jr. et al. |
| 2018/0048388 A1* | 2/2018 | Lee .................. H04B 10/502 |
| 2019/0132921 A1* | 5/2019 | Rumer .................. H05B 45/375 |
| 2020/0184032 A1 | 6/2020 | Huang |
| 2021/0274615 A1 | 9/2021 | Ghedin et al. |

OTHER PUBLICATIONS

CSS Electronics, "CAN BUS Explained—A Simple Intro (2019)," video retrieved from https://www.csselectronics.com/screen/page/simple-intro-to-can-bus/language/en on or about Feb. 19, 2020, 1 pp.

GeeksforGeeks, "Difference between Bit Rate and Baud Rate," published by user MKS075 retrieved from https://www.geeksforgeeks.org/difference-btween-bit-rate-and-baud-rate/ on or about Feb. 19, 2020, 3 pp.

* cited by examiner

FIG. 5 ically useful for LED drivers to regulate current through LED strings. Other LEDs, however, may require lower power, in which case a linear current source may be used to drive such LEDs based on a supply voltage.

INTERFACE EXPANDER CIRCUIT FOR LIGHT EMITTING DIODE (LED) DRIVER CIRCUITS

TECHNICAL FIELD

This disclosure relates circuits for driving and controlling light emitting diodes (LEDs), and more specifically circuits and techniques for controlling LEDs in a vehicle or similar setting.

BACKGROUND

Drivers are often used to control a voltage, current, or power at a load. For instance, a light emitting diode (LED) driver circuit may control the power supplied to a string of light emitting diodes. Some drivers may comprise a direct current (DC) to DC power converter, such as a buck-boost, buck, boost, or another DC to DC (DC/DC) converter. Such DC/DC power converters may be used to control and possibly change the power at the load based on a characteristic of the load. DC/DC power converters may be especially useful for LED drivers to regulate current through LED strings. Other LEDs, however, may require lower power, in which case a linear current source may be used to drive such LEDs based on a supply voltage.

Some LED circuits include a large number of individually controllable LEDs arranged in a two-dimensional matrix. The individually controllable LEDs can be driven so as to provide advanced lighting effects. Advanced vehicle headlamp systems, for example, are one example application of such LED circuits, whereby advanced lighting effects associated with vehicle operation can be used to improve the driving experience and to promote vehicle safety. Vehicle lighting that uses LED technology may include vehicle headlamps, interior vehicle lighting, exterior vehicle lighting, or any vehicle setting or feature where lighting is used. Other settings may have lighting features ore functions that are similar to that used in vehicles.

In automotive settings, a processor, such as a microprocessor, a graphics processing unit (GPU), an electronic control unit (ECU), or other clock-based processing circuit may provide control signals to the driver circuits in order to control the driver circuits and thereby control lighting functions and effects. Automotive lighting, however, can utilize a wide variety of lighting features and functions, and such lighting features and functions often vary between different vehicle makes and models. The wide variety of lighting features and functions presents challenges that are sometimes addressed by different software routines that operate on the processor.

SUMMARY

This disclosure is directed to an expander circuit that is configured to be positioned between a clock-based processor and a plurality of driver circuits that drive different sets of light emitting diodes (LEDs). The expander circuit may help with LED control, and may simplify, reduce, or eliminate different software routines that may otherwise be needed on the clock-based processor in order to control different configurations of driver circuits or different lighting situations. The clock-based processor can provide control signals over a communication bus interface to the expander circuit, and the expander circuit can include a bus interface circuit that is configured to receive the control signals from the processor over the communication bus. The expander circuit may include a plurality of modulation signal generators configured to generate modulation signals for driver circuits based on the control signals. For example, the plurality of modulation signal generators may each comprise one or more transistors that switch ON and OFF in order to create pulse frequency modulation (PWM) signals for a plurality of different driver circuits. The expander circuit may be configured to provide the modulation signals to the plurality of different driver circuits for driving the LEDs.

In one example, this disclosure describes an expander circuit configured to control a plurality of driver circuits for driving LEDs. The expander circuit may comprise a bus interface circuit configured to receive control signals from a processor over a communication bus, and a plurality of modulation signal generators configured to generate modulation signals based on the control signals, wherein the expander circuit is configured to provide the modulation signals to the plurality of driver circuits for driving the LEDs.

In another example, this disclosure describes a system comprising a plurality of driver circuits for driving LEDs, and expander circuit configured to control the plurality of driver circuits. The expander circuit may comprise a bus interface circuit configured to receive control signals from a processor over a communication bus, and a plurality of modulation signal generators configured to generate modulation signals based on the control signals, wherein the expander circuit is configured to provide the modulation signals to the plurality of driver circuits for driving the LEDs.

In another example, this disclosure describes a method that comprises receiving, at an expander circuit, control signals from a processor over a communication bus, generating, via the expander circuit, modulation signals based on the control signals; and outputting the modulation signals from the expander circuit to a plurality of driver circuits for driving LEDs.

Details of these and other examples are set forth in the accompanying drawings and the description below. Other features, objects, and advantages will be apparent from the description and drawings, and from the claims.

DETAILED DESCRIPTION

This disclosure is directed to circuits and techniques for controlling light emitting diodes (LEDs) in a vehicle or another setting. The circuits and techniques may be used to control exterior lights, interior lights, vehicle headlamps, or any type of vehicle lighting that uses LEDs. According to this disclosure, an expander circuit is configured to be positioned between a clock-based processor and a plurality of driver circuits that drive different sets of LEDs. The expander circuit configuration can facilitate LED control, and may simplify, reduce, or eliminate different software routines that may otherwise be needed on the clock-based processor in order to control different configurations of driver circuits or different lighting situations.

A clock-based processor can provide control signals over a communication bus interface to the expander circuit, and the expander circuit may include a bus interface circuit that is configured to receive the control signals from the processor over the communication bus. The expander circuit may include a plurality of modulation signal generators configured to generate modulation signals for driver circuits based on the control signals. For example, the plurality of modulation signal generators may each comprise one or more transistors that switch on and off, in order to create pulse frequency modulation (PWM) signals for a plurality of different driver circuits. The expander circuit may be configured to provide the modulation signals to the plurality of different driver circuits for driving different sets of the LEDs. A single bus interface between the processor and the expander circuit facilitates communication of control signals from the processor to the expander circuit over a common interface. The modulation signal generators within the expander circuit can generate the proper PWM signals for each of a plurality of driver circuits based on the control signals and output the PWM signals to each of the driver circuits.

Figure 1:
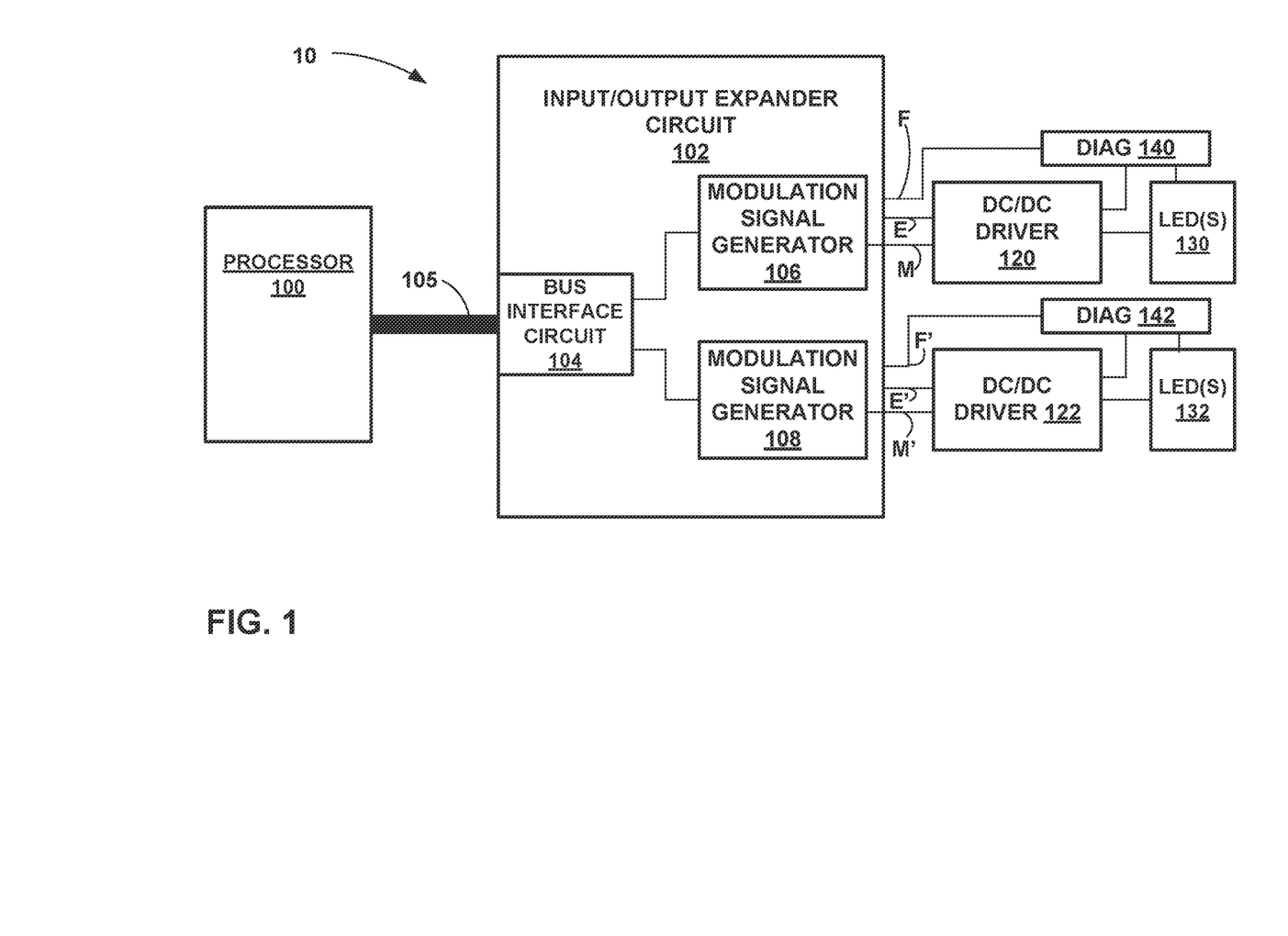
FIG. 1 is block diagram of an example system that includes a processor, an expander circuit, and a plurality of drivers.

FIG. 1 is block diagram of an example system 10 that includes a processor 100, an input/output expander circuit 102, and a plurality of DC/DC drivers 120, 122 configured to drive different sets of LEDs 130, 132. Processor 100 may comprise a microprocessor, a graphics processing unit (GPU), an electronic control unit (ECU), or other clock-based processing circuit capable of generating control signals associated with LED control.

In order to simplify processor 100 by simplifying software routines associated with processor 100 for controlling different sets or configurations of LEDs, processor 100 is configured to communicate LED control signals over a communication bus 105. Moreover, to facilitate this communication, input/output expander circuit 102 includes a bus interface circuit 104 that is configured to receive the LED control signals from processor 100 over communication bus 105. As examples, communication bus 105 may comprise any communication bus interface commonly used in automobile circuit applications. Examples of communication bus 105 may include a bus operating according to an ethernet protocol; a bus operating according to a controller area network (CAN) bus interface; a controller area network-flexible data (CAN-FD) bus interface; a local interconnect network (LIN) bus interface; a bus operating according to a universal asynchronous receiver/transmitter (UART) over CAN; or a controller area network-extra-large (CAN-XL) bus interface.

Bus interface circuit 104 is configured to receive the control signals from processor 100 over communication bus 105. In particular, bus interface circuit 104 may be configured to receive and interpret signals defined according to an ethernet protocol, a CAN bus protocol; a CAN-FD bus protocol; a LIN protocol; a UART protocol over CAN; or a CAN-XL bus protocol.

Input/output expander circuit 102 includes a plurality of modulation signal generators 106, 108 that are each configured to generate modulation signals based on the control signals received from processor 100 over communication bus 105 by bus interface circuit 104. In this way, input/output expander circuit 102 can create specific types of modulation signals (e.g., specific types of PWM signals) for controlling specific types of driver circuits, without the need for specifical software routines on processor 100 for such tasks.

Input/output expander circuit 102 is configured to provide the modulation signals to the plurality of driver circuits for driving the LEDs. In the example shown in FIG. 1, the plurality of driver circuits includes DC/DC driver 120 and DC/DC driver 122. DC/DC driver 120 and DC/DC driver 122 may each comprise a DC/DC power converter, although other types of drivers could also be supported, such as one or more linear current sources.

In some examples, input/output expander circuit 102 may include three or more pins for DC/DC driver 120 and three or more pins for DC/DC driver 122. For example, for each of DC/DC driver 120 and DC/DC driver 122, input/output expander circuit 102 may include a first pin to provide the modulation signals M, M' DC/DC drivers 120, 122, a second pin to send enable signals E, E' to DC/DC drivers 120, 122, and a third pin to receive a feedback signal F, F' associated with LEDs 130, 132.

Modulation signals M, M', for example may comprise pulse width modulation (PWM) signals, or other types of modulation signals, such as pulse duration modulation signals, pulse frequency modulation signals, pulse density modulation signals, or another type of modulation signal used for LED control. Enable signals E, E', for example, may comprise supply signals passing through input/output expander, or signals that enable supply from an external power supply, such as a battery. Feedback signals F, F' may comprise voltage measurements by a diagnostic unit 140, 142 used for checking the voltage drop over LEDs 130, 132. Input/output expander circuit 102 may be configured to use feedback signals F, F' to confirm whether LEDs 130, 132 are operating with the correct amount of voltage over LEDs 130, 132.

Figure 4:
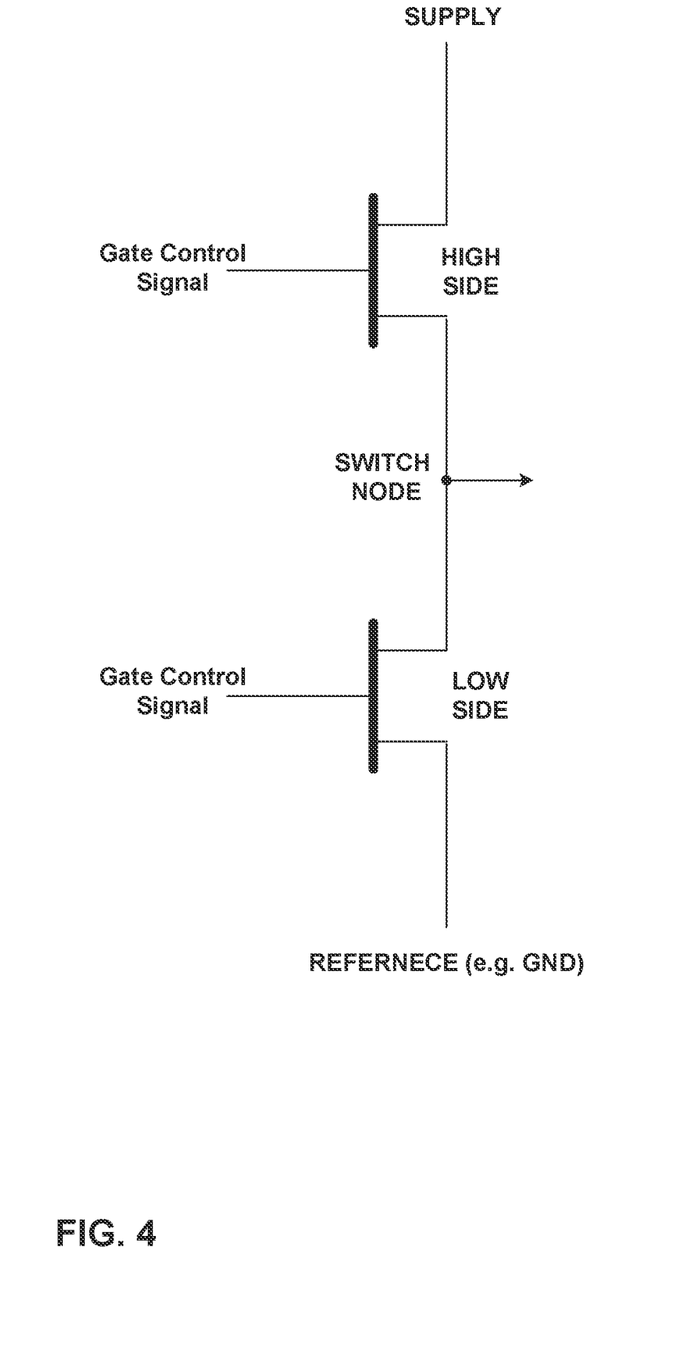
FIG. 4 is an example circuit diagram showing a high-side switch and a low-side switch that may be used within a modulation signal generator circuit.

In some examples, modulation signal generators 106, 108 each comprise one or more transistors configured to switch ON and OFF to generate PWM signals or other types of modulation signals. FIG. 4 is a circuit diagram illustrating one example of a modulation signal generator circuit 400 that could be used as modulation signal generators 106, 108 within input/output expander circuit 102. Modulation signal generator 400 may comprise a so-called push-pull circuit that includes a high-side transistor 402 and a low-side transistor 404. Gate control signals are used to define ON-OFF switching of high-side transistor 402 and low-side transistor 404 in order to deliver the desired power to a switch node positioned between the high-side and low-side switch. The complementary ON/OFF switching of transistors 402 and 404 breaks power delivery into discrete pulses at the switch node, and the width of such pulses can be controlled to define the correct or desired amount of power delivered to an LED load. In other examples, one or both of modulation signal generators 106, 108 may comprise a single power switch (i.e., a low-side power transistor) in a so-called open drain topology.

In some examples, in order to provide plug-and-play functionality between processor 100 and different types of drivers and to help reduce or eliminate the need for specialized software running on processor 100, input/output expander circuit 102 may comprise a circuit package with bus interface circuit 104 and modulation signal generators 106 and 108 being housed in a molding compound. In this case, the circuit package for input/output expander circuit 102 may include an input pin associated with bus 105 for receiving signals from processor 100, and three output pins for each of drivers 120, 122. The output pins, in this example, may correspond to signals F, E, M, F', E', and M'. Of course, the output pins associated with feedback signals F and F' may also be considered input pins, since they receive feedback associated with LEDs 130 and 132.

Figure 2:
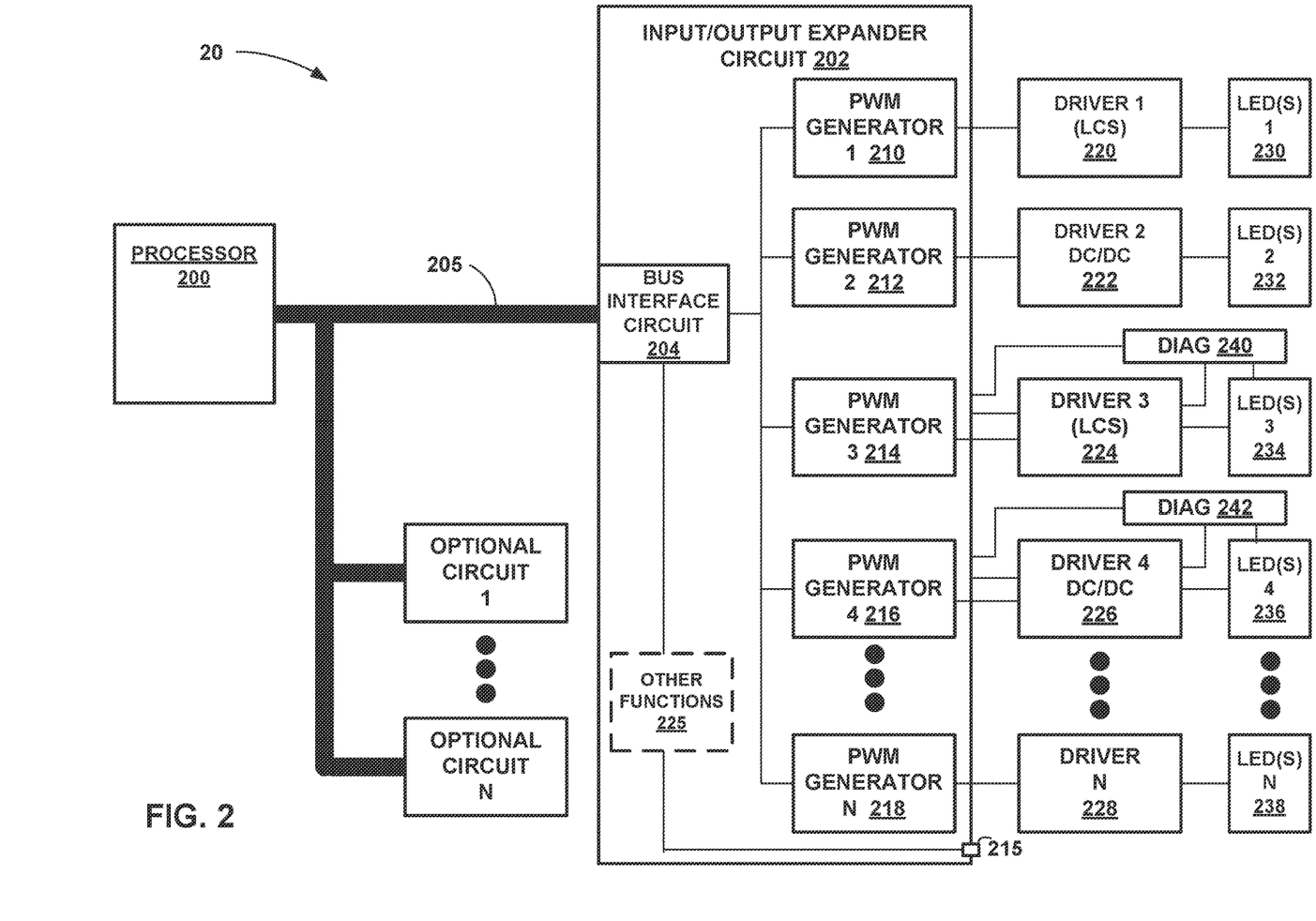
FIG. 2 is another block diagram of an example system that includes a processor, an expander circuit, and a plurality of drivers.

FIG. 2 is another block diagram of an example system 20 that includes a processor 200, an input/output expander circuit 202, and a plurality of drivers 1-N (220, 222, 224, 226, 228) for driving a plurality of different sets of LEDs 230, 232, 234, 236, and 238. Processor 200 may comprise a microprocessor, a GPU, an ECU, or another type of clock-based processing circuit capable of generating control signals associated with LED control.

Input/output expander circuit 202 includes bus interface circuit 204, which is configured to receive the control signals from processor 200 over a communication bus 205. Additional circuits (e.g., optional circuit 1 and optional circuit N) may also communicate with processor 200 over bus 205.

Like communication bus 105, communication bus 205 may comprise any communication bus interface commonly used in automobile circuit applications. Examples of communication bus 205 may include a bus operating according to an ethernet protocol; a bus operating according to a CAN bus interface; a CAN-FD bus interface; a LIN bus interface; a bus operating according to a UART over CAN; or a CAN-XL bus interface.

Bus interface circuit 204 is configured to receive the control signals from processor 200 over communication bus 205. In particular, bus interface circuit 204 may be configured to receive and interpret signals defined according to an ethernet protocol, a CAN bus protocol; a CAN-FD bus protocol; a LIN protocol; a UART protocol over CAN; or a CAN-XL bus protocol.

Input/output expander circuit 202 includes a plurality of modulation signal generators (e.g., PWM generators 1-N labeled as 210, 212, 214, 216, and 218), which are each configured to generate modulation signals based on the control signals received from processor 200 over communication bus 205. In this way, input/output expander circuit 202 can create specific types of modulation signals (e.g., specific types of PWM signals) for controlling specific types of driver circuits, without the need for specifical software routines on processor 200 for such tasks.

The types of connections and pins between input/output expander circuit 202 and different types of drivers may vary widely in different configurations of a system. The example system 20 shown in FIG. 2 includes a first driver 220 in the form of a linear current source, and a second driver 222 in the form of a DC/DC power converter. First driver 220 and second driver 222 are examples of single pin control, in which case PWM generator 210 sends PWM signals to first driver 220 and PWM generator 212 sends PWM signals to second driver 222. No feedback or enablement signaling is performed for drivers 220 and 222. In contrast, third driver 224 and fourth driver 226 are examples of three pin control similar to that described above in relation to FIG. 1. With three-pin control, a first pin from PWM generator 214 to third driver 224 provides the modulation signals, a second pin from input/output expander circuit to third driver 224 is configured to send enable signals, and a third pin from diagnostics unit 240 to third PWM generator 214 is configured to receive a feedback signal associated with LEDs 234. Similarly, a first pin from PWM generator 216 to fourth driver 226 provides the modulation signals, a second pin from input/output expander circuit to fourth driver 226 is configured to send enable signals, and a third pin from diagnostics unit 242 to fourth PWM generator 216 is configured to receive a feedback signal associated with LEDs 236.

Again, although modulation signals are shown as being generated by PWM generators in FIG. 2, or other types of modulation signals, such as pulse duration modulation signals, pulse frequency modulation signals, pulse density modulation signals, or another type of modulation signal used for LED control. Enable signals in three-pin control, for example, may comprise supply signals passing through input/output expander 202 or signals that enable a supply from an external power supply, such as a battery. Feedback signals in three-pin control may comprise voltage measurements by a diagnostic unit 240, 242 used for checking the voltage drop over LEDs 234, 236.

The example shown in FIG. 2 includes an Nth PWM generator 218, and Nth driver 228, and an Nth set of LEDs 238. The variable N may represent any positive integer and thus, the input/output expander circuits described herein (such as circuit 202) may support any number of drivers. FIG. 4 is a circuit diagram illustrating one example of a modulation signal generator circuit 400 that could be used as PWM generators 210, 212, 214, 216 and 218 within input/output expander circuit 202. As explained above, modulation signal generator 400 may comprise a so-called push-pull circuit that includes a high-side transistor 402 and a low-side transistor 404. Gate control signals are used to define ON-OFF switching of high-side transistor 402 and low-side transistor 404 in order to deliver the desired power to a switch node positioned between the high-side and low-side switch. The complementary ON/OFF switching of transistors 402 and 404 breaks power delivery into discrete pulses at the switch node, and the width of such pulses can be controlled to define the correct or desired amount of power delivered to an LED load. In other examples, some or all of PWM generators 210, 212, 214, 216 and 218 may each comprise a single power switch (i.e., a low-side power transistor) in a so-called open drain topology.

In some examples, input/output expander circuit 202 may support other functions 225 and may include one or more additional pins 215 for sending or receiving signals for such other functions. In some examples, the one or more additional pins 215 or the diagnostic pins associated with diagnostic circuits 204, 242 may be configured to receive a voltage measurement, which may comprise a voltage drop measurement or a temperature measurement from a thermistor or other voltage-based temperature measurement circuit. Other functions 225 may include receiving a voltage measurement, such as for include reading a negative temperature coefficient (NTC), reading a thermistor or a linear current source, or reading another voltage-based temperature circuit. Other functions 225 could also include reading an external NTC, reading a load voltage, reading a battery (supply) voltage, or other features.

Input/output expander circuit 202 may include one or more driver pins for each of the plurality of driver circuits. As noted, some drivers may require only a signal pin to receive PWM signals (e.g., driver 1 '220' and driver 2 '222'). Other drivers may require additional pins for improved control and monitoring functions. For example, driver 3 '224' and driver 4 '226' may have three-pin control and input/output expander circuit 202 can be configured to deliver such three-pin control as described herein. In some examples, one or more additional pins 215 may comprise a measurement pin configured to receive a voltage measurement, wherein the measurement pin is separate form the one or more driver pins. Also, in some cases, the pin between diagnostic unit 240 and expander circuit 202 and the pin between diagnostic unit 242 and expander circuit 202 may also comprise measurement pins configured to receive a voltage measurement.

In the example of FIG. 2, PWM generators 1-N (210, 212, 214, 216, and 218) may each comprise one or more transistors configured to switch ON and OFF to generate PWM signals. Again. FIG. 4 is a circuit diagram illustrating one example of a modulation signal generator circuit 400 that could be used to generate PWM signals within input/output expander circuit 202. As noted above, modulation signal generator 400 may comprise a so-called push-pull circuit that includes a high-side transistor 402 and a low-side transistor 404. Gate control signals are used to define ON-OFF switching of high-side transistor 402 and low-side transistor 404 in order to deliver the desired power to a switch node positioned between the high-side and low-side switch. The complementary ON/OFF switching of transistors 402 and 404 breaks power delivery into discrete pulses at the switch node, and the width of such pulses can be controlled to define the correct or desired amount of power delivered to an LED load. In other examples, modulation signal generators may each comprise a single power switch (i.e., a low-side power transistor) in a so-called open drain topology.

In some examples, in order to provide plug-and-play functionality between processor 200 and different types of drivers and to help reduce or eliminate the need for specialized software running on processor 200, input/output expander circuit 202 may comprise a circuit package with bus interface circuit 204, PWM generators 210, 212, 214, 216 and 218, and other optional functions 225 being housed in a molding compound. In this case, the circuit package for input/output expander circuit 202 may include an input pin associated with bus 105 for receiving signals from processor 200, and different sets of output pins for the different drivers 220, 222, 224, 226, and 228. The output pins, in this example, may include a single output pin for each of drivers 220, 222 and 228, and three different output pins for drivers 224 and 226. Of course, one of the output pins associated with drivers 224 and 226 may also be considered an input pin, since they receive feedback associated with LEDs 234 and 236.

Figure 3:
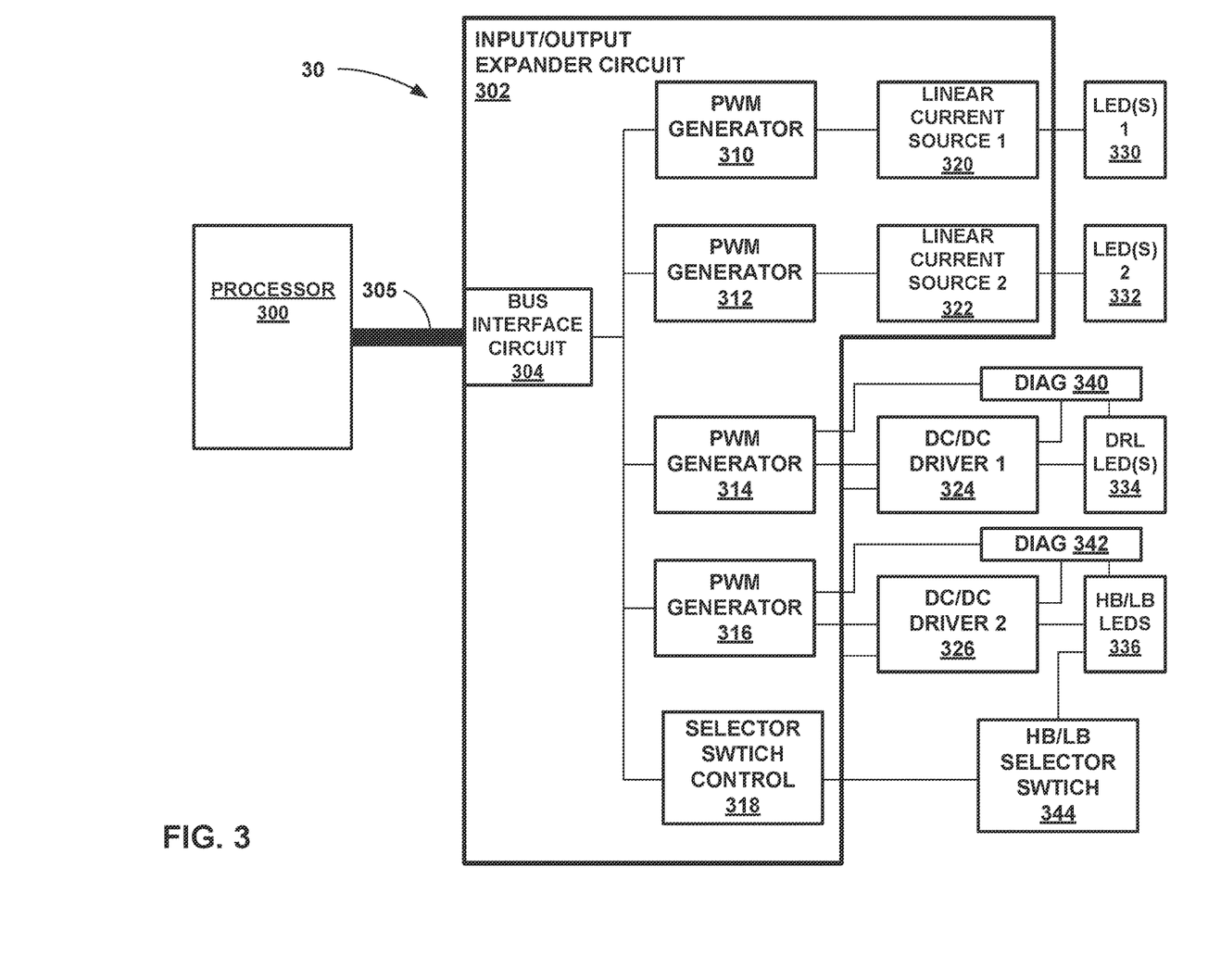
FIG. 3 is another block diagram of an example system that includes a processor, an expander circuit, and a plurality of drivers.

FIG. 3 is another block diagram of an example system 30 that includes a processor 300, an input/output expander circuit 302, and a plurality of drivers 324, 326 for driving a plurality of different sets of LEDs 334, 336. In the example design shown in FIG. 3, however, linear current source driver 1 (320) and linear current source driver 2 (322) are included within input/output expander circuit 302, which is possible if the supply is sufficient to drive LEDs 330 and 332 without any DC/DC conversion boost.

As with other examples, input/output expander circuit 302 in FIG. 3 includes bus interface circuit 304, which is configured to receive the control signals from processor 300 over a communication bus 305. Processor 300 may comprise a microprocessor, a GPU, an ECU, or another type of clock-based processing circuit capable of generating control signals associated with LED control.

Similar to other examples above, communication bus 305 may comprise any communication bus interface commonly used in automobile circuit applications. Examples of communication bus 205 may include a bus operating according to an ethernet protocol; a bus operating according to a CAN bus interface; a CAN-FD bus interface; a LIN bus interface; a bus operating according to a UART over CAN; or a CAN-XL bus interface.

Bus interface circuit 304 is configured to receive the control signals from processor 300 over communication bus 305. In particular, bus interface circuit 304 may be configured to receive and interpret signals defined according to an ethernet protocol, a CAN bus protocol; a CAN-FD bus protocol; a LIN protocol; a UART protocol over CAN; or a CAN-XL bus protocol.

In the example of FIG. 3, input/output expander circuit 302 includes a plurality of modulation signal generators (e.g., PWM generators 310, 312, 314, and 316), which are each configured to generate modulation signals based on the control signals received from processor 300 over communication bus 305. In this way, input/output expander circuit 302 can create specific types of modulation signals (e.g., specific types of PWM signals) for controlling specific types of driver circuits, without the need for specifical software routines on processor 300 for such tasks.

In the example system 30 shown in FIG. 3, input/output expander circuit 302 includes a first driver in the form of a linear current source 320 and a second driver in the form of another linear current source 322. First driver 320 and second driver 322 are examples of drivers for which the supply voltage is sufficient to drive sets of LEDs 330, 332. Since these drivers may not require a DC/DC boost, the linear current sources can be included inside of input/output expander circuit 302, which is desirable for some uses.

PWM generator 310 sends PWM signals to linear current source 320 and PWM generator 312 sends PWM signals to linear current source 322. Feedback or voltage-based analysis may also be performed, although these features are not illustrated in FIG. 3. In contrast, to linear current source 320 and linear current source 322, DC/DC driver 1 324 and DC/DC driver 2 326 are external to input/output expander circuit 302 and are connected to input/output expander circuit 302 via one or more pins (e.g., three pin control similar to that described above). Again, with three-pin control, a first pin from PWM generator 314 to DC/DC driver 324 provides the modulation signals, a second pin from input/output expander circuit to DC/DC driver 324 is configured to send enable signals, and a third pin from diagnostics unit 340 to PWM generator 314 is configured to receive a feedback signal associated with LEDs 334. Similarly, a first pin from PWM generator 316 to DC/DC driver 326 provides the modulation signals, a second pin from input/output expander circuit 302 to DC/DC driver 326 is configured to send enable signals, and a third pin from diagnostics unit 342 to PWM generator 316 is configured to receive a feedback signal associated with LEDs 336.

Once again, although modulation signals are shown as being generated by PWM generators in FIG. 3, or other types of modulation signals, such as pulse duration modulation signals, pulse frequency modulation signals, pulse density modulation signals, or another type of modulation signal used for LED control. FIG. 4 is a circuit diagram illustrating one example of a modulation signal generator circuit 400 that could be used as PWM generators 310, 312, 314, and 316 within input/output expander circuit 302. As explained above, modulation signal generator 400 may comprise a so-called push-pull circuit that includes a high-side transistor 402 and a low-side transistor 404. Gate control signals are used to define ON-OFF switching of high-side transistor 402 and low-side transistor 404 in order to deliver the desired power to a switch node positioned between the high-side and low-side switch. The complementary ON/OFF switching of transistors 402 and 404 breaks power delivery into discrete pulses at the switch node, and the width of such pulses can be controlled to define the correct or desired amount of power delivered to an LED load. In other examples, some or all of PWM generators 310, 312, 314, and 316 may each comprise a single power switch (i.e., a low-side power transistor) in a so-called open drain topology.

Enable signals in three-pin control, for example, may comprise supply signals passing through input/output expander 302 or signals that enable a supply from an external power supply, such as a battery. Feedback signals in three-pin control may comprise voltage measurements by a diagnostic unit 340, 342 used for checking the voltage drop over LEDs 334, 336. In still other examples, diagnostics can also be included for external LEDs 330, 332 controlled by internal linear current sources 320, 322 (e.g., internal to input/output expander circuit 302), and this may require one or more additional pins.

FIG. 3 also shows some additional features that may be especially useful in automotive settings. In particular, a first DC/DC driver 324 comprising a power converter may be configured to control daytime running light (DRL) LEDs 334 and a second DC/DC driver 326 comprising another power converter may be configured to control both high beam (HB) LEDs and low beam (LB) LEDs 336 of the vehicle. In this case, input/output expander circuit 302 may further include a selector switch control 318 which may comprise a gate driver for controlling a HB/LB selector switch 344. Input/output expander circuit 302 may be configured to receive high beam or low beam selection commands from processor 300 via the bus interface circuit 304 and to control HB/LB selector switch 344 associated with the second DC/DC power converter to select either the high beams or the low beams.

In some examples, in order to provide plug-and-play functionality between processor 300 and different types of drivers and to help reduce or eliminate the need for specialized software running on processor 300, input/output expander circuit 302 may comprise a circuit package with bus interface circuit 304, PWM generators 310, 312, 314, and 316, linear current sources 320 and 322, and selector switch control 318 being housed in a molding compound. In this case, the circuit package for input/output expander circuit 302 may include an input pin associated with bus 305 for receiving signals from processor 300, and different sets of output pins for LEDs 300 and 332, the different DC/DC drivers 324 and 326, and HB/LB selector switch 344. The output pins, in this example, may include a single output pin from each linear current source 320, 322 for connecting to the different sets of LEDs 330, 332, and three different output pins for each DC/DC driver 324, 326 for connecting to and enabling DC/DC drivers 324, 326 and receiving feedback associated with LEDs 334 and 336. The feedback pins may receive feedback from diagnostics units 340 and 342 and thus may be considered input pins because of this received feedback. In addition, in this example, the output pins may include another output pin associated with selector switch control 318 for sending signals to a HB/LB selector switch 344 that is outside of the circuit package.

Figure 5:
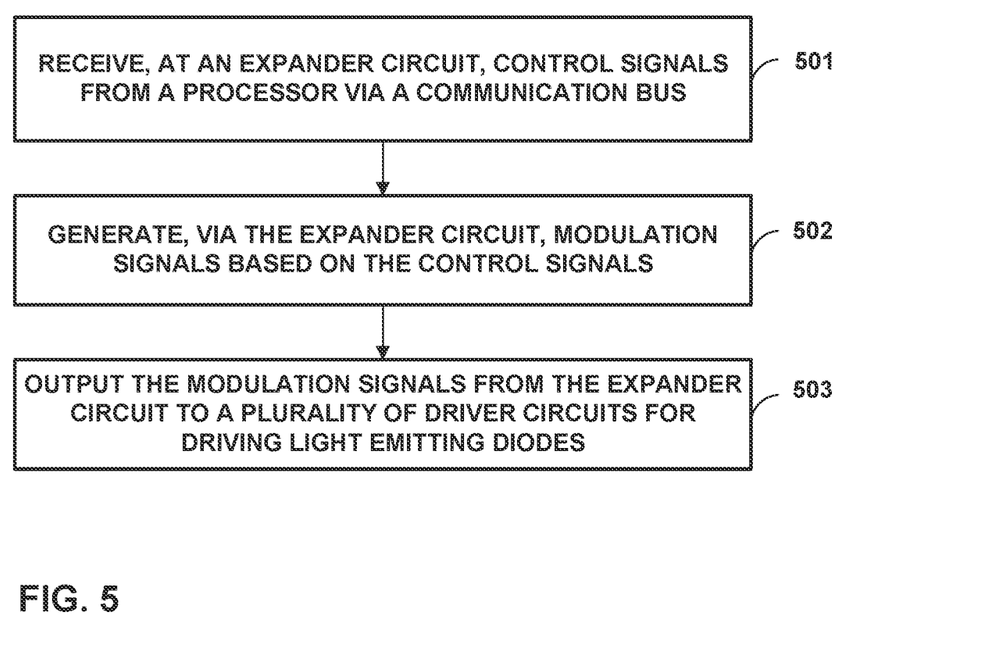
FIG. 5 is a flow diagram showing a technique consistent with this disclosure.

FIG. 5 is a flow diagram showing a technique consistent with this disclosure. As shown in FIG. 5, an expander circuit 102, 202, 302 may receive control signals from a processor 100, 200, 300 over a communication bus 105, 205, 305 via a bus interface circuit 104, 204, 304 (501). Expander circuit 102, 202, 302 generates modulation signals based on the control signals (502). In particular, expander circuit 102, 202, 302 incudes modulation signal generators (e.g., 106, 108, 210, 212, 214, 216, 218, 314, 316) that can generate PWM signals (or other modulation signals). Expander circuit 102, 202, 302 outputs the modulation signals to specific ones of a plurality of driver circuits 120, 122, 220, 222, 224, 226, 228, 324, 326 for driving different sets of light emitting diodes 130, 132, 230, 232, 234, 236, 238, 334, 336 (503).

The following clauses may illustrate one or more aspects of the disclosure.

Clause 1—An expander circuit configured to control a plurality of driver circuits for driving light emitting diodes (LEDs), the expander circuit comprising: a bus interface circuit configured to receive control signals from a processor over a communication bus; and a plurality of modulation signal generators configured to generate modulation signals based on the control signals, wherein the expander circuit is configured to provide the modulation signals to the plurality of driver circuits for driving the LEDs.

Clause 2—The expander circuit of clause 1, wherein the plurality of driver circuits comprises two or more DC/DC power converters.

Clause 3—The expander circuit of clause 2, wherein the plurality of driver circuits comprises two or more DC/DC power converters and one or more linear current sources.

Clause 4—The expander circuit of clause 2 or 3, wherein the LEDs comprise first LEDs and wherein the expander circuit further comprises one or more linear current sources for driving one or more second LEDs.

Clause 5—The expander circuit of any of clauses 2-4, wherein the expander circuit includes three or more pins for each of the two or more DC/DC power converters.

Clause 6—The expander circuit of clause 5, wherein the three or more pins include a first pin to provide one or more of the modulation signals to one of the DC/DC power converters, a second pin to enable one of the DC/DC power converters, and a third pin to receive a feedback signal associated with one or more of the LEDs.

Clause 7—The expander circuit of clause 6, wherein the third pin is configured to receive a voltage measurement.

Clause 8—The expander circuit of any of clauses 1-7, wherein the expander circuit includes one or more driver pins for each of the plurality of driver circuits.

Clause 9—The expander circuit of clause 8, wherein the expander circuit includes a measurement pin configured to receive a voltage measurement, wherein the measurement pin is separate form the one or more driver pins.

Clause 10—The expander circuit of any of clauses 2-9, wherein the two or more DC/DC power converters include a first DC/DC power converter configured to control daytime running lights (DRLs) and a second DC/DC power converter configured to control high beams and low beams.

Clause 11—The expander circuit of clause 10, wherein the expander circuit is configured to receive high beam or low beam selection commands from the processor via the bus interface circuit and to control a selector switch associated with the second DC/DC power converter to select either the high beams or the low beams.

Clause 12—The expander circuit of any of clauses 1-11, wherein the modulation signal generators each comprise one or more transistors configured to switch on and off to generate pulse width modulation (PWM) signals.

Clause 13—A system comprising: a plurality of driver circuits for driving light emitting diodes (LEDs); and an expander circuit configured to control the plurality of driver circuits, the expander circuit comprising: a bus interface circuit configured to receive control signals from a processor over a communication bus; and a plurality of modulation signal generators configured to generate modulation signals based on the control signals, wherein the expander circuit is configured to provide the modulation signals to the plurality of driver circuits for driving the LEDs.

Clause 14—The system of clause 13, further comprising the processor connected to the expander circuit via the communication bus.

Clause 15—The system of clause 13 or 14, wherein the plurality of driver circuits comprises two or more DC/DC power converters.

Clause 16—The system of clause 15, wherein the plurality of driver circuits further comprises one or more linear current sources.

Clause 17—The system of clause 15 or 16, wherein the LEDs comprise first LEDs and wherein the expander circuit further comprises one or more linear current sources for driving one or more second LEDs.

Clause 18—The system of any of clauses 15-17, wherein the expander circuit includes three or more pins for each of the two or more DC/DC power converters.

Clause 19—The system of clause 18, wherein the three or more pins include a first pin to provide one or more of the modulation signals to one of the DC/DC power converters, a second pin to enable one of the DC/DC power converters, and a third pin to receive a feedback signal associated with one or more of the LEDs.

Clause 20—The system of any of clauses 13-19, wherein the modulation signal generators each comprise one or more transistors configured to generate pulse width modulation (PWM) signals.

Clause 21—A method comprising: receiving, at an expander circuit, control signals from a processor over a communication bus; generating, via the expander circuit, modulation signals based on the control signals; and outputting the modulation signals from the expander circuit to a plurality of driver circuits for driving light emitting diodes (LEDs).

Various aspects have been described in this disclosure. These and other aspects are within the scope of the following claims.

The invention claimed is:

1. An expander circuit package housed in a molding compound and configured to be positioned between a processor and a plurality of driver circuits that drive light emitting diodes (LEDs), the expander circuit package comprising:
   a bus interface circuit housed in the molding compound and configured to receive control signals from the processor over a communication bus; and
   a plurality of modulation signal generators housed in the molding compound and configured to generate modulation signals based on the control signals,
   wherein the expander circuit package is configured to output the modulation signals from the expander circuit package to the plurality of driver circuits for driving the LEDs.

2. The expander circuit package of claim 1, wherein the plurality of driver circuits comprises two or more DC/DC power converters and the modulation signals comprise pulse width modulation (PWM) signals for the two or more DC/DC power converters.

3. The expander circuit package of claim 2, wherein the plurality of driver circuits further comprise one or more linear current sources and wherein the expander circuit package is configured to output additional signals to control the linear current sources.

4. The expander circuit package of claim 2, wherein the LEDs comprise first LEDs and
   wherein the expander circuit package further comprises one or more linear current sources housed in the molding compound for driving one or more second LEDs.

5. The expander circuit package of claim 2, wherein the expander circuit package includes three or more output pins for each of the two or more DC/DC power converters.

6. The expander circuit package of claim 5, wherein the three or more output pins include a first pin to provide one or more of the modulation signals to one of the DC/DC power converters, a second pin to enable one of the DC/DC power converters, and a third pin to receive a feedback signal associated with one or more of the LEDs.

7. The expander circuit package of claim 6, wherein the third pin is configured to receive a voltage measurement.

8. The expander circuit package of claim 1, wherein the expander circuit package includes one or more driver pins for each of the plurality of driver circuits.

9. The expander circuit package of claim 8, wherein the expander circuit package includes a measurement pin configured to receive a voltage measurement, wherein the measurement pin is separate form the one or more driver pins.

10. The expander circuit package of claim 2, wherein the two or more DC/DC power converters include a first DC/DC power converter configured to control daytime running lights (DRLs) and a second DC/DC power converter configured to control high beams and low beams.

11. The expander circuit package of claim 10, wherein the expander circuit package is configured to receive high beam or low beam selection commands from the processor via the bus interface circuit and to control a selector switch associated with the second DC/DC power converter to select either the high beams or the low beams.

12. The expander circuit package of claim 1, wherein the modulation signal generators each comprise one or more transistors configured to switch on and off to generate pulse width modulation (PWM) signals.

13. A system comprising:
   a processor;
   a plurality of driver circuits that drive light emitting diodes (LEDs); and
   an expander circuit package housed in a molding compound and configured to be positioned between the processor and the plurality of driver circuits that control the plurality of driver circuits, the expander circuit package comprising:
      a bus interface circuit housed in the molding compound and configured to receive control signals from the processor over a communication bus; and
      a plurality of modulation signal generators housed in the molding compound and configured to generate modulation signals based on the control signals,
      wherein the expander circuit package is configured to output the modulation signals from the expander circuit package to the plurality of driver circuits for driving the LEDs.

14. The system of claim 13, wherein the plurality of driver circuits comprises two or more DC/DC power converters and the modulation signals comprise pulse width modulation (PWM) signals for the two or more DC/DC power converters.

15. The system of claim 14, wherein the plurality of driver circuits further comprises one or more linear current sources and wherein the expander circuit package is configured to output additional signals to control the linear current sources.

16. The system of claim 14, wherein the LEDs comprise first LEDs and wherein the expander circuit package further comprises one or more linear current sources housed in the molding compound for driving one or more second LEDs.

17. The system of claim 14, wherein the expander circuit package includes three or more output pins for each of the two or more DC/DC power converters.

18. The system of claim 17, wherein the three or more output pins include a first pin to provide one or more of the modulation signals to one of the DC/DC power converters, a second pin to enable one of the DC/DC power converters, and a third pin to receive a feedback signal associated with one or more of the LEDs.

19. The system of claim 13, wherein the modulation signal generators each comprise one or more transistors configured to generate pulse width modulation (PWM) signals.

20. A method of operating an expander circuit package housed in a molding compound and configured to be positioned between a processor and a plurality of driver circuits that drive light emitting diodes (LEDs), the method comprising:
    receiving, at the expander circuit package control signals from the processor over a communication bus;
    generating, via the expander circuit package, modulation signals based on the control signals; and
    outputting the modulation signals from the expander circuit package to the plurality of driver circuits for driving light emitting diodes (LEDs).

* * * * *